(12) United States Patent
Krey et al.

(10) Patent No.: US 9,980,129 B2
(45) Date of Patent: May 22, 2018

(54) TRANSFERRING AN ASSIGNMENT REGARDING AN EMBEDDED UNIVERSAL INTEGRATED CIRCUIT ENTITY FROM A FIRST MOBILE NETWORK OPERATOR TO A SECOND MOBILE NETWORK OPERATOR

(71) Applicant: DEUTSCHE TELEKOM AG, Bonn (DE)

(72) Inventors: Sven Krey, Bonn (DE); Thorsten Sinning, Aachen (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days. days.

(21) Appl. No.: 15/517,527

(22) PCT Filed: Oct. 5, 2015

(86) PCT No.: PCT/EP2015/072955
§ 371 (c)(1),
(2) Date: Apr. 7, 2017

(87) PCT Pub. No.: WO2016/055419
PCT Pub. Date: Apr. 14, 2016

(65) Prior Publication Data
US 2017/0311155 A1    Oct. 26, 2017

(30) Foreign Application Priority Data

Oct. 10, 2014    (EP) ..................... 14188567

(51) Int. Cl.
*H04L 29/06*    (2006.01)
*H04W 12/04*    (2009.01)
(Continued)

(52) U.S. Cl.
CPC .......... *H04W 12/04* (2013.01); *H04W 8/205* (2013.01); *H04W 12/06* (2013.01);
(Continued)

(58) Field of Classification Search
None
See application file for complete search history.

(56) References Cited

U.S. PATENT DOCUMENTS

| 9,572,016 B2 * | 2/2017 | Cormier | ............... H04W 8/183 |
| 2008/0141313 A1 * | 6/2008 | Kato | ................... H04N 7/1675 |
| | | | 725/62 |

(Continued)

OTHER PUBLICATIONS

"$3^{rd}$ Generation Partnership Project; Technical Specification Group Services and System Aspects; Feasibility study on the security aspects of remote provisioning and change of subscription for Machine to Machine (M2M) equipment (Release 9)", 3GPP Standard; 3GPP TR 33.812, $3^{rd}$ Generation Partnership Project (3GPP), Mobile Competence Centre; 650, Roue Des Lucioles; F-06921 Sophia-Antipolis Cedex; France, No. V9.2.0, Jun. 22, 2010 (Jun. 22, 2010), pp. 1-87, XP050441986, p. 15, paragraph 5.1—p. 32.

*Primary Examiner* — David Bilodeau
(74) *Attorney, Agent, or Firm* — Leydig, Voit & Mayer, Ltd.

(57) ABSTRACT

A method for transferring an assignment regarding an embedded universal integrated circuit entity within an electronic device from a first mobile network operator to a second mobile network operator includes: in a first step, the embedded universal integrated circuit entity is initialized, together with the electronic device, to be used with the first mobile network operator and a corresponding mobile communication network; and in a second step, subsequent to the first step, the assignment regarding the embedded universal integrated circuit entity is transferred from the first mobile network operator to the second mobile network operator.

10 Claims, 2 Drawing Sheets

(51) Int. Cl.
*H04W 8/20* (2009.01)
*H04W 12/06* (2009.01)
*H04W 8/18* (2009.01)
*H04W 8/26* (2009.01)
*H04W 4/00* (2018.01)
*H04W 88/18* (2009.01)

(52) U.S. Cl.
CPC ...... *H04L 63/0428* (2013.01); *H04L 63/0869* (2013.01); *H04W 4/005* (2013.01); *H04W 8/18* (2013.01); *H04W 8/26* (2013.01); *H04W 88/18* (2013.01)

(56) References Cited

U.S. PATENT DOCUMENTS

| | | | |
|---|---|---|---|
| 2010/0106967 A1* | 4/2010 | Johansson | H04L 9/12 713/158 |
| 2011/0035584 A1* | 2/2011 | Meyerstein | H04W 8/265 713/155 |
| 2013/0288750 A1* | 10/2013 | Itoh | H04L 12/2856 455/558 |
| 2016/0105784 A1* | 4/2016 | Gellens | H04M 3/5116 455/404.1 |

* cited by examiner

TRANSFERRING AN ASSIGNMENT REGARDING AN EMBEDDED UNIVERSAL INTEGRATED CIRCUIT ENTITY FROM A FIRST MOBILE NETWORK OPERATOR TO A SECOND MOBILE NETWORK OPERATOR

CROSS-REFERENCE TO RELATED APPLICATIONS

This application is a U.S. National Phase application under 35 U.S.C. § 371 of International Application No. PCT/EP2015/072955, filed on Oct. 5, 2015, and claims benefit to European Patent Application No. EP 14188567.3, filed on Oct. 10, 2014. The International Application was published in English on Apr. 14, 2016 as WO 2016/055419 A1 under PCT Article 21(2).

FIELD

The present invention relates to a method for transferring an assignment regarding an embedded universal integrated circuit entity within an electronic device from a first mobile network operator to a second mobile network operator.

Furthermore, the present invention relates to a system for transferring an assignment regarding an embedded universal integrated circuit entity within an electronic device from a first mobile network operator to a second mobile network operator, the system comprising the electronic device with the embedded universal integrated circuit entity, the first mobile network operator, the second mobile network operator, and a specific repository.

Additionally, the present invention relates to an electronic device for transferring an assignment regarding an embedded universal integrated circuit entity within an electronic device from a first mobile network operator to a second mobile network operator.

Furthermore, the present invention relates to a mobile communication network adapted for transferring an assignment regarding an embedded universal integrated circuit entity within an electronic device from a first mobile network operator to a second mobile network operator.

Additionally, the present invention relates to a specific repository adapted to be used in or with a mobile communication network.

Furthermore, the present invention relates to a program and to a computer program product for transferring an assignment regarding an embedded universal integrated circuit entity within an electronic device from a first mobile network operator to a second mobile network operator.

BACKGROUND

Nowadays, most mobile devices, also called user equipments, mobile terminals, or the like, to be used in connection with mobile communication networks—typically cellular mobile communication networks such public land mobile networks—normally require a subscriber identity module (SIM) or a universal subscriber identity module (USIM) in order to function normally.

The subscriber identity module or universal subscriber identity module may also be referred to as a universal integrated circuit card. A universal integrated circuit card (UICC) is a smart card inserted into the mobile terminal (or user equipment) and used as a user authentication module. The universal integrated circuit card may store personal information on a user and information on a mobile network operator (MNO) of a mobile service subscribed by the user.

For example, the universal integrated circuit card may include an International Mobile Subscriber Identity (IMSI) to identify a user.

When the user installs the universal integrated circuit card in a user terminal or in a user equipment or also in a machine type communication device (MTC device), user authentication is automatically achieved using the information stored in the universal integrated circuit card, enabling the user to conveniently use the user equipment (or mobile device or machine type communication device). Further, when the user equipment (or mobile device or machine type communication device) is replaced, the user may install the universal integrated circuit card, detached from the user equipment, on a new user equipment, thereby conveniently changing the user equipment.

However, the requirement for the universal integrated circuit card to be replaceable has a number of drawbacks, especially related to the size of the user equipment, to the accessibility of the universal integrated circuit card within the user equipment, and the like. Therefore, embedded universal integrated circuit cards have been introduced. These embedded universal integrated circuit cards are not, or at least not easily, detachable from the hardware structure of the user equipment (or mobile terminal or machine type communication device). For example, the embedded universal integrated circuit cards are integrated or permanently connected (e.g. by soldering) to radio modules of the user equipments. Such radio modules typically provide the capabilities for physically enabling the establishment of a radio link between, on the one hand, the electronic device in question (such as the user equipment, the mobile device or the machine type communication device), and, on the other hand, a mobile communication network, typically according to one of the access technologies of mobile communication networks, such as GSM (Global System for Mobile Communication), UMTS (Universal Mobile Telecommunication System), LTE (Long term Evolution) and/or LTE advanced.

However, the use of embedded universal integrated circuit cards also have drawbacks such as problems associated with the initialization of the embedded universal integrated circuit card and/or with the provisioning of the embedded universal integrated circuit cards, especially in case that a mobile device needs to be used in a mobile communication network at the time of production of, e.g., a product into which the mobile device is integrated, and with the further requirement that the mobile device needs to be used later on in a different mobile communication network, i.e. a transfer of an assignment needs to be done between different mobile network operators.

SUMMARY

In an exemplary embodiment, the present invention provides a method for transferring an assignment regarding an embedded universal integrated circuit entity within an electronic device from a first mobile network operator to a second mobile network operator. The embedded universal integrated circuit entity is integrated in the electronic device. The electronic device comprises a microprocessor. The method includes the following steps: in a first step, the embedded universal integrated circuit entity is initialized, together with the electronic device, to be used with the first mobile network operator and a corresponding mobile communication network by using—by the electronic device and the embedded universal integrated circuit entity—an access number for communication contacts with the first mobile network operator and the mobile communication network, wherein first subscription related information and/or first logging related information, related to the embedded universal integrated circuit entity and/or to the electronic device, is stored, by the first mobile network operator, in a specific repository accessible to the first mobile network operator, wherein the first subscription related information and/or the first logging related information relates to the use of the embedded universal integrated circuit entity and/or the electronic device with the first mobile network operator; and in a second step, subsequent to the first step, the assignment regarding the embedded universal integrated circuit entity is transferred from the first mobile network operator to the second mobile network operator, wherein— when conducting the transfer of the assignment—the first subscription related information and/or the first logging related information of the specific repository is accessed by the second mobile network operator.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
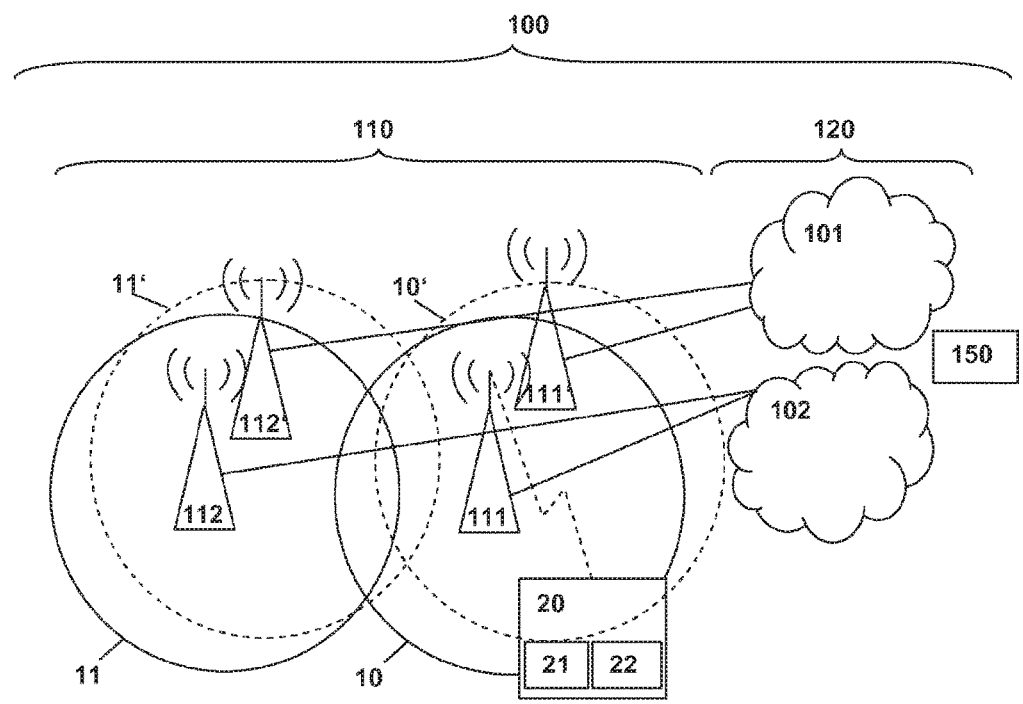
FIG. 1 schematically illustrates a mobile communication network and an electronic device that has access to the mobile communication network. Additionally, a specific repository is schematically shown.
Figure 2:
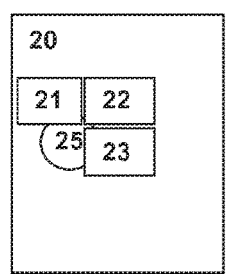
FIG. 2 schematically illustrates an example of an electronic device according to the present invention.

Exemplary embodiments of the present invention provide a technically simple, effective and especially cost effective solution for transferring an assignment regarding an embedded universal integrated circuit entity within an electronic device from a first mobile network operator to a second mobile network operator such that it is possible to provide a maximum of flexibility and to reduce the requirements and hence the costs associated with the transfer process, while still providing a comparatively high level of security against fraud and misuse associated with the transfer process.

In an exemplary embodiment, the present invention provides a method for transferring an assignment regarding an embedded universal integrated circuit entity within an electronic device from a first mobile network operator to a second mobile network operator, wherein the embedded universal integrated circuit entity is integrated in the electronic device, wherein the electronic device comprises a microprocessor, wherein the method comprises the following steps:

in a first step, the embedded universal integrated circuit entity is initialized, together with the electronic device, to be used with the first mobile network operator and a corresponding mobile communication network by using—by the electronic device and the embedded universal integrated circuit entity—an access number for communication contacts with the first mobile network operator and the mobile communication network, wherein first subscription related information and/or first logging related information, related to the embedded universal integrated circuit entity and/or to the electronic device, is stored, by the first mobile network operator, in a specific repository accessible to the first mobile network operator, wherein the first subscription related information and/or the first logging related information relates to the use of the embedded universal integrated circuit entity and/or the electronic device with the first mobile network operator, in a second step, subsequent to the first step, the assignment regarding the embedded universal integrated circuit entity is transferred from the first mobile network operator to the second mobile network operator, wherein—when conducting the transfer of the assignment—the first subscription related information and/or the first logging related information of the specific repository is accessed by the second mobile network operator.

It is thereby advantageously possible according to the present invention that the transfer of an assignment regarding an embedded universal integrated circuit entity within an electronic device from a first mobile network operator to a second mobile network operator can be realized more cost effectively, hence it is possible to realize that the access to the use of mobile communication networks is enhanced and applied to even more categories of products such as machines and consumer products.

According to the present invention, it is furthermore advantageously possible that each mobile network operator is able to activate any arbitrary embedded universal integrated circuit entity or embedded universal integrated circuit card immediately and globally.

Furthermore according to the present invention, it is advantageously possible for each mobile network operator to take over the administration of an arbitrary embedded universal integrated circuit entity or embedded universal integrated circuit card from another mobile network operator.

Additionally, it is advantageously possible to apply the method according to the present invention to machine type communication devices, i.e. user equipments that are or can be connected to mobile communication networks that are typically not operated by human beings but are connected to machines or to other devices that communicate with such machine type communication devices in order to automatically perform certain tasks such as transmitting meter readings or providing other kinds of sensor readings or the like.

One aspect of the present invention is to provide enhanced possibilities how communication is able to be automated between different machines, especially in the manner of machine type communication devices (also called "machine to machine communication" or "machine2machine communication" or "machine type communication").

According to the present invention, it is advantageously possible to equip machines and consumer products with radio modules and embedded universal integrated circuit entities or embedded universal integrated circuit cards already at the time of production of such machines and consumer products, and nevertheless track any changes with regard to the assignment to specific mobile network operators later on.

The embedded universal integrated circuit entities or embedded universal integrated circuit cards are, e.g., realized as surface mounted devices attached to the printed circuit board of a radio module of the machines and consumer product such as electronic devices. Alternatively, the embedded universal integrated circuit entities or embedded universal integrated circuit cards are realized as part of the integrated circuits of the processor or another integrated circuit of the machines and consumer products, e.g. monolithically integrated into the main processor of such products.

According to the present invention, the embedded universal integrated circuit entity (or embedded universal integrated circuit card) is typically integrated in the electronic device, i.e. in the machine or consumer product. Furthermore, a memory area is assigned to the embedded universal integrated circuit entity or embedded universal integrated circuit card, wherein the memory area is normally part of the embedded universal integrated circuit entity or embedded universal integrated circuit card. Typically, the electronic device comprises a microprocessor as well as a radio module that provides the capabilities for physically enabling the establishment of a radio link between the electronic device and a mobile communication network.

In a first step, the embedded universal integrated circuit entity is initialized, together with the electronic device, to be used with the first mobile network operator and a corresponding mobile communication network by using—by the electronic device and the embedded universal integrated circuit entity—an access number for communication contacts with the first mobile network operator and the mobile communication network. The access number is used by the electronic device and the embedded universal integrated circuit entity (or the embedded universal integrated circuit card) for communicating with the mobile communication network and/or the first mobile network operator. Thereby, first subscription related information and/or first logging related information are generated that are related to the embedded universal integrated circuit entity and/or to the electronic device, i.e. the first subscription related information and/or the first logging related information relate to the use of the embedded universal integrated circuit entity and/or the electronic device with the first mobile network operator. These first subscription related information and/or first logging related information is stored, by the first mobile network operator, in a specific repository that is accessible to the first mobile network operator.

In a second step, subsequent to the first step, the assignment regarding the embedded universal integrated circuit entity is transferred from the first mobile network operator to the second mobile network operator, wherein—when conducting the transfer of the assignment—the first subscription related information and/or the first logging related information of the specific repository is accessed by the second mobile network operator. This means that the subscription related information and/or logging related information, generated by the first mobile network operator (i.e. the first subscription related information and/or the first logging related information) can be accessed by—i.e. are accessible to—the second mobile network operator.

According to the present invention, it is supposed that the embedded universal integrated circuit entity (or the embedded universal integrated circuit card) is initialized via an initial communication contact, during which data relating to the identity of the radio module and/or relating to the identity of the embedded universal integrated circuit entity (or embedded universal integrated circuit card) are used in order to generate an initial serial number for either the radio module or the embedded universal integrated circuit entity (or the embedded universal integrated circuit card) or both of the radio module and the embedded universal integrated circuit entity (embedded universal integrated circuit card). Based on the initial serial number, the access number is allocated (by the mobile communication network, i.e. the first mobile network operator) to the embedded universal integrated circuit entity (or the embedded universal integrated circuit card) for subsequent communication contacts after having successfully completed the initial communication contact.

The access number is typically assigned by the mobile communication network to the embedded universal integrated circuit entity (or embedded universal integrated circuit card) such that the access number is able to be used by the embedded universal integrated circuit entity (embedded universal integrated circuit card) and the radio module for subsequent communication contacts with the mobile communication network, after the initial communication contact.

When using embedded universal integrated circuit entities (or embedded universal integrated circuit cards), there might be problems regarding the assignment of the embedded universal integrated circuit entities to new mobile network operators and/or new contractual conditions as well as—especially—in case that a change in the user and/or owner of the embedded universal integrated circuit entity (or embedded universal integrated circuit card) occurs. This is, e.g., the case in the situation that the electronic device (that comprises the embedded universal integrated circuit entity (or the embedded universal integrated circuit card)) is sold by a first person to a second person, especially in case that the previous contents of the embedded universal integrated circuit entity (or embedded universal integrated circuit card) is initialized. It should be assured that subsequent users or owners of the electronic device are able to have access to the data on (or in memory areas of) the embedded universal integrated circuit entity (or the embedded universal integrated circuit card). However, in order to use the electronic device (comprising the embedded universal integrated circuit entity (or the embedded universal integrated circuit card)) for its intended use, it might be necessary, for a subsequent user or owner of the electronic device, to have access to data or settings that are typically lost during the transfer of an assignment from a first mobile network operator to a second mobile network operator. It is conceivable that it requires comparatively important efforts to a user or to an owner of the electronic device (e.g. a machine or a consumer device) or to the current mobile network operator in order to get hold of such previous data or settings. This might be the case due to the fact that neither the user/owner of the electronic device and neither the current mobile network operator of the electronic device have an interface to the manufacturer of the electronic device, i.e. a machine or a consumer device, or to the mobile network operator at the time of manufacturing of the electronic device. Both the manufacturer of the electronic device and the mobile network operator at manufacturing time of the electronic device together have configured the initial the first operation of the electronic device. Nowadays several profiles are stored e.g. in the cases that a customer signs off or changes his contact with his present Mobile Network Operator. This method has several disadvantages if the history of mobile network operators has not been properly documented. Further the profiles are storing previously defined data records, which limits the flexibility in application of embedded universal integrated circuit entities (or the embedded universal integrated circuit cards)

According to the present invention, it is advantageously possible to provide a solution in case that the manufacturer of the electronic device and the mobile network operator at manufacturing time of the electronic device want to provide access to certain data or settings regarding the embedded universal integrated circuit entity (or embedded universal integrated circuit card) to the current mobile network operator and/or the current user/owner of the electronic device. Especially, it is advantageously possible according to the present invention that the current owner/user of the electronic device (or the current mobile network operator) asks the initial mobile network operator to reset or otherwise modify the embedded universal integrated circuit entity (or the embedded universal integrated circuit card). According to the present invention, a specific repository is used in order to exchange (and/or to provide access to) data and/or setting information (in the context of the present invention also designated by the terms subscription related information and logging related information) between different mobile network operators that are subsequently involved in handling the electronic device comprising the embedded universal integrated circuit entity (or the embedded universal integrated circuit card).

It is thereby advantageously possible according to the present invention that the steps of the initialization and of the activation of the embedded universal integrated circuit entity (or embedded universal integrated circuit card) can be decoupled and hence treated separately.

It is especially advantageously possible according to the present invention that information is stored in the specific repository in parallel to the creation of the entry in the home location register during initialization of the embedded universal integrated circuit entity (or embedded universal integrated circuit card). Furthermore, it is advantageously possible according to the present invention that information comprised by the specific repository are referenced to external databases, especially comprising information related to quality management and/or status information with respect to embedded universal integrated circuit entities (or embedded universal integrated circuit cards).

By using the specific repository as an extended home location register HLR (or home subscriber server HSS) in order to store the initialization data or information regarding embedded universal integrated circuit entities (or embedded universal integrated circuit cards), especially together with a reference to external databases, it is advantageously possible according to the present invention to use mobile radio access technology in new scenarios compared to conventionally known scenarios such as telemetry and/or telematics.

According to a preferred embodiment of the present invention, second subscription related information and/or second logging related information, related to the embedded universal integrated circuit entity and/or to the electronic device, is stored, by the second mobile network operator, in the specific repository, wherein the second subscription related information and/or the second logging related information relates to the use of the embedded universal integrated circuit entity and/or the electronic device with the second mobile network operator.

Thereby, it is advantageously possible, according to the present invention, to also generate second subscription related information and/or second logging related information during the time that the electronic device is used with the second mobile network operator.

According to a preferred embodiment of the present invention, the transfer of the assignment from the first mobile network operator to the second mobile network operator is an indirect transfer such that the assignment regarding the embedded universal integrated circuit entity is transferred—in a first transfer step—from the first mobile network operator to a third mobile network operator, and—in a second transfer step—from the third mobile network operator to the second mobile network operator.

Thereby, it is advantageously possible, according to the present invention, that not only a direct transfer from the first mobile network operator to the second mobile network operator is possible but also a chain of transfers, e.g. from the first mobile network operator to a third mobile network operator, from the third mobile network operator to the second mobile network operator. Alternatively, also more than three mobile network operators can be involved in such a chain of transfers, e.g. from the first mobile network operator to a third mobile network operator, from the third mobile network operator to a fourth mobile network operator, from a fourth mobile network operator to a fifth mobile network operator, and from the fifth mobile network operator to the second mobile network operator.

According to the present invention, it is furthermore preferred that third subscription related information and/or third logging related information, related to the embedded universal integrated circuit entity and/or to the electronic device, is stored, by the third mobile network operator, in the specific repository, wherein the third subscription related information and/or the third logging related information relates to the use of the embedded universal integrated circuit entity and/or the electronic device with the third mobile network operator, wherein the third subscription related information and/or the third logging related information of the specific repository is accessible by the second mobile network operator and/or by the first mobile network operator.

Thereby, it is advantageously possible, according to the present invention, to also generate third subscription related information and/or third logging related information during the time that the electronic device is used with the third mobile network operator.

It is especially preferred according to the present invention that the third subscription related information and/or the third logging related information of the specific repository is accessible by the second mobile network operator and/or by the first mobile network operator. As the second mobile network operator can be a mobile network operator that is activated only at a point in time after many transfer steps have occurred, the advantage according to the present invention comprises the fact that the second mobile network operator can have access to the third subscription related information and/or the third logging related information (i.e. relating to a subscription which is finished during a long time and with—potentially several—intermediate mobile network operators and related transfers).

According to the present invention, it is furthermore preferred that during or subsequent to the first step, a status test is conducted by the embedded universal integrated circuit entity and/or the microprocessor, wherein by conducting the status test, status test result information is generated, wherein at least an information indicative of the status test result information is part of the first subscription related information and/or the first logging related information, stored by the first mobile network operator, in the specific repository accessible to the second mobile network operator and/or to the third mobile network operator.

Thereby, it is advantageously possible to use the specific repository to contain at least an information indicative of the status test result information, or—according to an alternative embodiment of the present invention—also the status test result information (in case that the status test result information is transmitted to the mobile communication network, i.e. to the specific repository typically assigned to the home location register of the mobile communication network of the first mobile network operator) for providing the possibility to later retrieve this information, potentially by other mobile network operators.

According to a further preferred embodiment of the present invention, the transfer of the assignment, from the first mobile network operator to the second mobile network operator, regarding the embedded universal integrated circuit entity is conducted by at least receiving, by the first mobile network operator, a request for transferring the assignment, generating, by the first mobile network operator, of a transfer permission information including at least an identifier of the embedded universal integrated circuit entity, and sending a transfer permission message to the embedded universal integrated circuit entity and/or to the electronic device which includes the transfer permission information.

Thereby, it is advantageously possible to maintain a relatively enhanced level of security while still being able to perform exemplary embodiments of the inventive method easily and cost effectively.

According to the present invention, it is furthermore preferred that the transfer permission information indicates a permission for the embedded universal integrated circuit entity to transfer the assignment from a subscription manager of the first mobile network operator to a subscription manager of the second mobile network operator or to a subscription manager of the third mobile network operator.

According to the present invention, it is thereby advantageously possible to easily and cost effectively realize the transfer of the assignment regarding the embedded universal integrated circuit entity (or embedded universal integrated circuit card) and the radio module of an exemplary embodiment of the inventive electronic device between different mobile network operators.

Furthermore, the present invention relates to a system for transferring an assignment regarding an embedded universal integrated circuit entity within an electronic device from a first mobile network operator to a second mobile network operator, wherein the embedded universal integrated circuit entity is integrated in the electronic device, wherein the electronic device comprises a microprocessor, wherein the system comprises the electronic device with the embedded universal integrated circuit entity, the first mobile network operator, the second mobile network operator, and a specific repository, wherein the system is configured such that:

the embedded universal integrated circuit entity is initialized, together with the electronic device, to be used with the first mobile network operator and a corresponding mobile communication network by using— by the electronic device and the embedded universal integrated circuit entity—an access number for communication contacts with the first mobile network operator and the mobile communication network, wherein first subscription related information and/or first logging related information, related to the embedded universal integrated circuit entity and/or to the electronic device, is stored, by the first mobile network operator, in the specific repository accessible to the first mobile network operator, wherein the first subscription related information and/or the first logging related information relates to the use of the embedded universal integrated circuit entity and/or the electronic device with the first mobile network operator, the assignment regarding the embedded universal integrated circuit entity is transferred from the first mobile network operator to the second mobile network operator, wherein—when conducting the transfer of the assignment—the first subscription related information and/or the first logging related information of the specific repository is accessed by the second mobile network operator.

Thereby, it is advantageously possible to provide a system such that greater convenience is achieved in transferring an assignment to different mobile network operators regarding an embedded universal integrated circuit entity (or an embedded universal integrated circuit card) and/or a radio module of an electronic device.

Furthermore, the present invention relates to an electronic device for transferring an assignment regarding an embedded universal integrated circuit entity within the electronic device from a first mobile network operator to a second mobile network operator, wherein the embedded universal integrated circuit entity is integrated in the electronic device, wherein the electronic device comprises a microprocessor, wherein the electronic device is configured such that:

the embedded universal integrated circuit entity is initialized, together with the electronic device, to be used with the first mobile network operator and a corresponding mobile communication network by using— by the electronic device and the embedded universal integrated circuit entity—an access number for communication contacts with the first mobile network operator and the mobile communication network, wherein first subscription related information and/or first logging related information, related to the embedded universal integrated circuit entity and/or to the electronic device, is stored, by the first mobile network operator, in a specific repository accessible to the first mobile network operator, wherein the first subscription related information and/or the first logging related information relates to the use of the embedded universal integrated circuit entity and/or the electronic device with the first mobile network operator, the assignment regarding the embedded universal integrated circuit entity is transferred from the first mobile network operator to the second mobile network operator, wherein—when conducting the transfer of the assignment—the first subscription related information and/or the first logging related information of the specific repository is accessed by the second mobile network operator.

Thereby, it is advantageously possible to provide an electronic device such that greater convenience is achieved in provisioning an embedded universal integrated circuit entity (or an embedded universal integrated circuit card) and/or a radio module of an electronic device.

Furthermore, it is preferred according to the present invention—especially with respect to the electronic device but also with respect to exemplary embodiments of the inventive method, the inventive system and the inventive mobile communication network—that the embedded universal integrated circuit entity is an embedded universal integrated circuit card.

In the context of the present invention, the term "embedded universal integrated circuit entity" designates the provision of the functionality of an embedded universal integrated circuit card, regardless of whether this functionality is realized via physically integrating into the electronic device of a hardware module (either, e.g., soldered to a printed circuit board as an individual module, or otherwise integrated, such as, e.g., monolithically integrated with the processor on the (typically silicon) substrate of the (main) processor of the electronic device itself) or purely in software, such as, e.g., part of the operating system of the electronic device.

Furthermore, the present invention relates to a mobile communication network adapted for transferring an assignment regarding an embedded universal integrated circuit entity within an electronic device from a first mobile network operator to a second mobile network operator, wherein the embedded universal integrated circuit entity is integrated in the electronic device, wherein the electronic device comprises a microprocessor, wherein the mobile communication network comprises a specific repository, wherein the mobile communication network is configured such that:

the embedded universal integrated circuit entity is initialized, together with the electronic device, to be used with the first mobile network operator and a corresponding mobile communication network by using— by the electronic device and the embedded universal integrated circuit entity—an access number for communication contacts with the first mobile network operator and the mobile communication network, wherein first subscription related information and/or first logging related information, related to the embedded universal integrated circuit entity and/or to the electronic device, is stored, by the first mobile network operator, in the specific repository accessible to the first mobile network operator, wherein the first subscription related information and/or the first logging related information relates to the use of the embedded universal integrated circuit entity and/or the electronic device with the first mobile network operator, the assignment regarding the embedded universal integrated circuit entity is transferred from the first mobile network operator to the second mobile network operator, wherein—when conducting the transfer of the assignment—the first subscription related information and/or the first logging related information of the specific repository is accessed by the second mobile network operator.

Thereby, it is advantageously possible to provide a mobile communication network such that it is possible to easily and cost effectively transfer an assignment to different mobile network operators regarding the embedded universal integrated circuit entity (or embedded universal integrated circuit card) and/or the electronic device. Further it is an advantage in flexibility of implementing use cases based on the continuously logging data from the embedded universal integrated circuit entity and/or the adjacent radio module and/or the adjacent supplementary environment, the radio module has been implemented to.

Furthermore, the present invention relates to a specific repository adapted to be used in or with an exemplary embodiment of an inventive mobile communication network.

Thereby, it is advantageously possible to provide a specific repository such that it is possible to easily and cost effectively transfer an assignment to different mobile network operators regarding the embedded universal integrated circuit entity (or embedded universal integrated circuit card) and/or the electronic device—and especially that each of the different mobile network operators has access to previous events related to the embedded universal integrated circuit entity (or embedded universal integrated circuit card) and/or the electronic device.

Additionally, the present invention relates to a program comprising a computer readable program code which, when executed on a computer and/or on a network node or on a plurality of network nodes of a mobile communication network and/or on an embedded universal integrated circuit entity and/or on a microprocessor of an electronic device, or in part on a network node or on a plurality of network nodes of a mobile communication network and in part on an embedded universal integrated circuit entity and in part on a microprocessor of an electronic device, causes the computer and/or network node or the plurality of network nodes and/or the embedded universal integrated circuit entity and/or the microprocessor of the electronic device to perform exemplary embodiments of the inventive method.

Still additionally, the present invention relates to a computer program product for transferring an assignment regarding an embedded universal integrated circuit entity within an electronic device from a first mobile network operator to a second mobile network operator, the computer program product comprising a computer program stored on a storage medium, the computer program comprising program code which, when executed on a computer and/or on a network node or on a plurality of network nodes of a mobile communication network and/or on an embedded universal integrated circuit entity and/or on a microprocessor of an electronic device, or in part on a network node or on a plurality of network nodes of a mobile communication network and in part on an embedded universal integrated circuit entity and in part on a microprocessor of an electronic device, causes the computer and/or network node or the plurality of network nodes and/or the embedded universal integrated circuit entity and/or the microprocessor of the electronic device to perform exemplary embodiments of the inventive method.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

In FIG. 1, a mobile communication network 100, especially a public land mobile network, typically using cellular radio access technology, is schematically shown.

The mobile communication network 100 comprises an access network 110 and a core network 120. The mobile communication network 100 is preferably a cellular telecommunications network comprising typically a plurality of network cells (or radio cells). Typically, more than one mobile network operator is present in a geographical area. Therefore, two neighboring network cells (or radio cells) are represented in FIG. 1 by means of reference signs 10 and 11 that are related to a first mobile network operator 101. Additionally, two neighboring network cells (or radio cells) are represented in FIG. 1 by means of reference signs 10' and 11' that are related to a second mobile network operator 102. The mobile communication network 100 (or the mobile communication networks, each one associated to one of the mobile network operators) typically comprises (or comprise) a plurality of user equipments or telecommunication devices or mobile terminals or electronic devices 20 (having a radio module 22 and an embedded universal integrated circuit entity 21, especially an embedded universal integrated circuit card. The access network 110 of the mobile communication network 100 of the first mobile network operator 101 comprises, in the exemplary representation of FIG. 1, a first base station entity 111, serving the (first) radio cell 10. Furthermore, a neighbor (second) base station entity 112, serving the neighbor (second) radio cell 11, is schematically shown. The base transceiver stations 111, 112 are typically base stations or base station entities, e.g. a NodeB or an eNodeB base transceiver station. The access network 110 of the mobile communication network 100 of the second mobile network operator 101 comprises, in the exemplary representation of FIG. 1, a first base station entity 111', serving the (first) radio cell 10'. Furthermore, a neighbor (second) base station entity 112', serving the neighbor (second) radio cell 11', is schematically shown. The base transceiver stations 111', 112' are typically base stations or base station entities, e.g. a NodeB or an eNodeB base transceiver station.

In order for the mobile communication network 100 (or the mobile network operators 101, 102) to provide communication services to the user equipment or the electronic device 20, it is necessary that a connection is established between the mobile communication network 100 and the user equipment or electronic device 20. The establishment of such a communication necessitates the provisioning of access data, especially an access number, with respect to the user equipment or electronic device 20.

According to the present invention, such a provisioning of access data to the electronic device 20 (i.e. with respect to the embedded universal integrated circuit entity 21 (or embedded universal integrated circuit card)) is realized. The electronic device 20 comprises a microprocessor 23 as well as a radio module 22. The radio module 22 provides the capabilities for physically enabling the establishment of a radio link between the electronic device 20 on the one hand, and the mobile communication network 100 on the other hand.

According to the present invention, each mobile network operator 101, 102 is able to activate any arbitrary embedded universal integrated circuit entity 21 or embedded universal integrated circuit card immediately and globally. Furthermore according to the present invention, each mobile network operator 101, 102 is able to take over the administration of an arbitrary embedded universal integrated circuit entity 21 or embedded universal integrated circuit card from another mobile network operator 101, 102.

It is furthermore advantageously possible according to the present invention that for each embedded universal integrated circuit entity 21 (or embedded universal integrated circuit card), it is possible to generate documentation information such that this documentation information can be shared between the different mobile network operators 101, 102 during the lifetime of the embedded universal integrated circuit entity 21 (or embedded universal integrated circuit card 21). Typically, such documentation information is generated by the initial (i.e. the first) mobile network operator 101; but the documentation information (as well as additional information, e.g. generated by other mobile network operators) can be made available to all the other (i.e. typically subsequent) mobile network operators 102

According to the present invention, it is advantageously possible to realize restrictions in the use of the electronic device 20 via the embedded universal integrated circuit entity 21 (or embedded universal integrated circuit card). For example, it is possible to restrict the region (e.g. a continent) in which the electronic device (such as a car or a machine or the like) can be used or in which a guarantee is provided for the electronic device 20. Thereby, it is advantageously possible to provide a protection against theft, e.g., for machines that are equipped with an embedded universal integrated circuit entity 21 (or an embedded universal integrated circuit card). Furthermore, by using the embedded universal integrated circuit entity 21 (or the embedded universal integrated circuit card) it is advantageously possible to verify maintenance tasks regarding the electronic device 20 (such as machines, cars or other devices).

Additionally, it is advantageously possible according to the present invention that—via the embedded universal integrated circuit entity 21 (or the embedded universal integrated circuit card) within the electronic device 20—it is possible to realize restrictions regarding the use of the electronic device 20 (e.g. the electronic device 20 is only able to be used in a certain geographic area but not in another geographic area).

Additionally, the use of consumer articles—or the use of military devices or flying device, e.g. for aerial reconnaissance—can also be restricted in an analogous manner.

Furthermore, machines for the professional use, e.g. in hospitals, might be allowed but could be restricted for use in other environments.

Conventionally, home location register repositories comprise entries such as access numbers, international mobile station equipment identity (IMEI), Mobile Subscriber Integrated Services Digital Network Number (MSISDN), the location of the electronic device 20, mobile network operator, charging information and the like.

According to the present invention, the specific repository realizes the functionality of an enhanced home location register (or enhanced home subscriber server) such that additional data or information can be retrieved for such a repository, especially data or information relating to the lifecycle of the electronic device and/or of the embedded universal integrated circuit entity 21 (or the embedded universal integrated circuit card), comprising especially (but not being limited to):

data or information related to contracts,
  data or information related to the status,
  data or information related to external databases,
  data or information related to the history of the usage of the electronic device and/or the associated embedded universal integrated circuit entity 21 (or embedded universal integrated circuit card).

Figure 3:
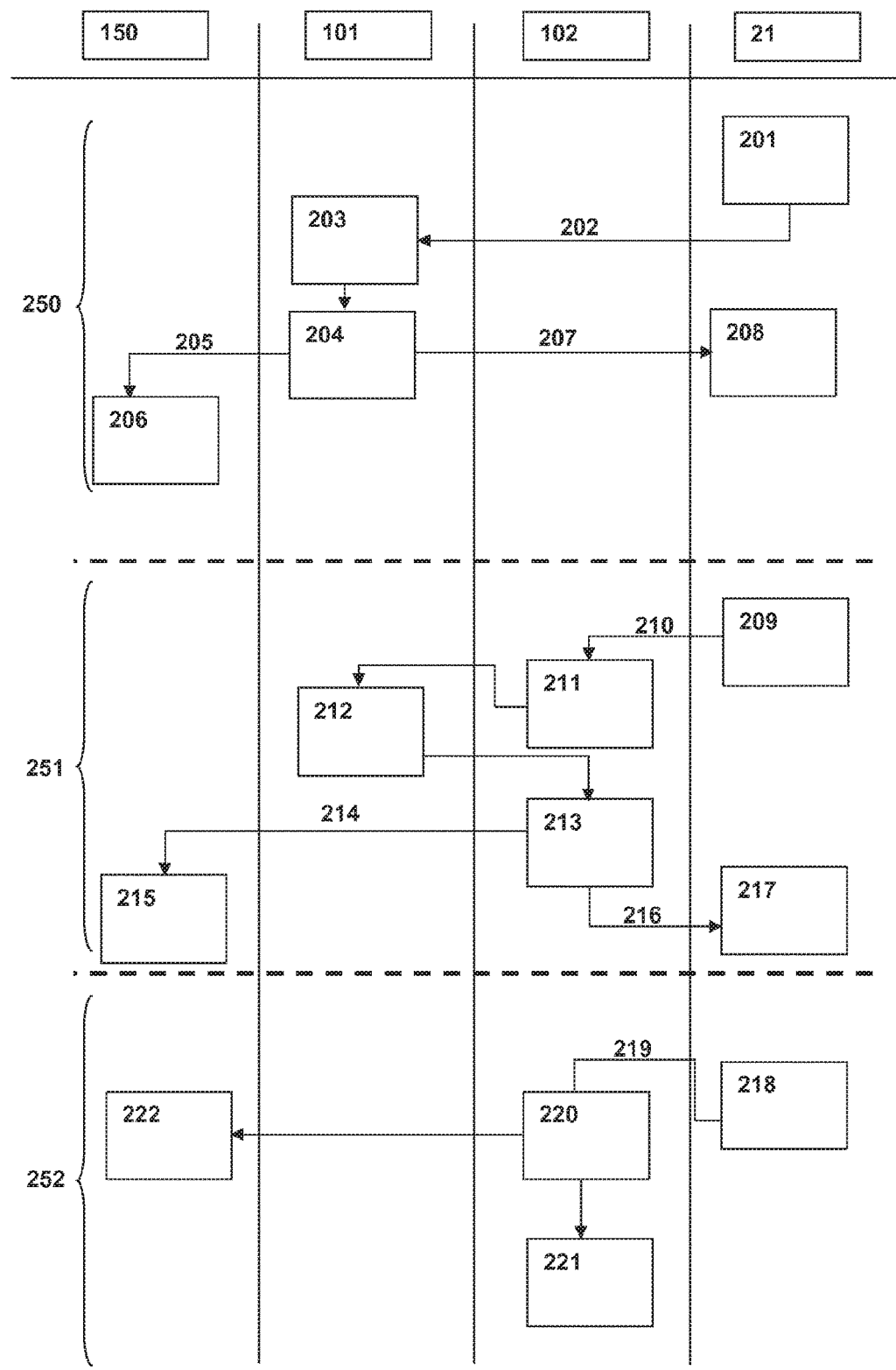
FIG. 3 schematically illustrates an example of a method for transferring an assignment regarding an embedded universal integrated circuit entity within an electronic device from a first mobile network operator to a second mobile network operator.

In FIG. 3, an example of the inventive method for provisioning an embedded universal integrated circuit entity 21 or embedded universal integrated circuit card within an electronic device 20 is schematically represented. FIG. 3 represents the communication between the specific repository 150, the first mobile network operator 101, the second mobile network operator 102, and the embedded universal integrated circuit entity 21 (embedded universal integrated circuit card 21) itself.

The inventive method according to an exemplary embodiment of the present invention and represented in FIG. 3 can be broadly separated into three parts:

- a first part 250 related to the initialization of the embedded universal integrated circuit entity 21 (or embedded universal integrated circuit card) together with the radio module 23; exchange of data with the first mobile network operator 101, typically at a time of manufacturing of the electronic device 20,
- a second part 251 related to the use of the electronic device 20 with the embedded universal integrated circuit entity 21 (or the embedded universal integrated circuit card) during the time of use of the electronic device 20 involving typically an exchange of data with the second mobile network operator 102, and
- a third part 252 related to an exemplary use of the embedded universal integrated circuit entity 21 (or embedded universal integrated circuit card 21) for data logging purposes.

An exemplary embodiment of the inventive process or method starts at a first processing step 201. During the first processing step 201, the initialization of the embedded universal integrated circuit entity 21 (or embedded universal integrated circuit card) is realized. The process is continued in a second processing step 202. During the second processing step 202, a request is transmitted to the mobile communication network 100 of the first mobile network operator 101. The process is continued in a third processing step 203. During the third processing step 203, the access number is allocated. Furthermore, the entry, in the home location register of the first mobile network operator 101, related to the embedded universal integrated circuit entity 21 (or the embedded universal integrated circuit card) is generated. The process is continued in a fourth processing step 204. During the fourth processing step 204, the entry of the access number and of the international mobile subscriber identity for transmission to the specific repository is prepared in the home location register of the first mobile network operator 101. The process is continued in a fifth processing step 205 and to a seventh processing step 207. During the fifth processing step 205, the reference to the enhanced home location register or specific repository 150 is provided. The process is continued in a sixth processing step 206. During the sixth processing step 206, the entries in the specific repository 150 are created. The process is continued in a seventh processing step 207. During the seventh processing step 207, initialization information is transmitted back to the embedded universal integrated circuit entity 21 (or embedded universal integrated circuit card). The process is continued in an eighth processing step 208. During the eighth processing step 208, the initialization of the embedded universal integrated circuit entity 21 (or embedded universal integrated circuit card) is finished.

During a ninth processing step 209, the embedded universal integrated circuit entity 21 (embedded universal integrated circuit card) is switched on. The process is continued in a tenth processing step 210. During the tenth processing step 210, the embedded universal integrated circuit entity 21 (embedded universal integrated circuit card) is registered with the second mobile network operator 102. The process is continued in an eleventh processing step 211. During the eleventh processing step 211, a request to the home location register of the first mobile network operator 101 is generated. The process is continued in a twelfth processing step 212. During the twelfth processing step 212, the embedded universal integrated circuit entity 21 (embedded universal integrated circuit card) is registered—via the login data, the access number and/or the international mobile subscriber identity—at the home location register of the first mobile network operator 102. The process is continued in a thirteenth processing step 213. During the thirteenth processing step 213, the data from the home location register of the first mobile network operator 101 are taken over by the home location register of the second mobile network operator 102. The process is continued in a fourteenth processing step 214 and in a sixteenth processing step 216. During the fourteenth processing step 214, it is verified, by accessing the specific repository 150, whether the data in the home location register of the second mobile network operator 102 matches the data of the specific repository 150. The process is continued in a fifteenth processing step 215. During the fifteenth processing step 215, the specific repository 150 generates a confirmation. During the sixteenth processing step 216, the confirmation is received. The process is continued in a seventeenth processing step 217. During the seventeenth processing step 217, the confirmation is received at the embedded universal integrated circuit entity 21 (or embedded universal integrated circuit card).

During an eighteenth processing step 218, data are recorded from the electronic device 20 or from the radio module of the electronic device 20. The process is continued in a nineteenth processing step 219. During the nineteenth processing step 219, the data are logged. The process is continued in a twentieth processing step 220. During the twentieth processing step 220, the reference is forwarded and the data are transmitted. The process is continued in a twenty-first processing step 221. During the twenty-first processing step 221, the corresponding data are stored to the home location register of the second mobile network operator 102. The process is continued in a twenty-second processing step 222. During the twenty-second processing step 222, the data are stored in the specific repository 150 or enhanced home location register.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for transferring an assignment regarding an embedded universal integrated circuit entity within an electronic device from a first mobile network operator to a second mobile network operator, wherein the embedded universal integrated circuit entity is integrated in the electronic device, wherein the electronic device comprises a microprocessor, wherein the method comprises the following steps:

in a first step, the embedded universal integrated circuit entity is initialized, together with the electronic device, to be used with the first mobile network operator and a corresponding mobile communication network by using—by the electronic device and the embedded universal integrated circuit entity—an access number for communication contacts with the first mobile network operator and the mobile communication network, wherein first subscription related information and/or first logging related information, related to the embedded universal integrated circuit entity and/or to the electronic device, is stored, by the first mobile network operator, in a specific repository accessible to the first mobile network operator, wherein the first subscription related information and/or the first logging related information relates to the use of the embedded universal integrated circuit entity and/or the electronic device with the first mobile network operator; and in a second step, subsequent to the first step, the assignment regarding the embedded universal integrated circuit entity is transferred from the first mobile network operator to the second mobile network operator, wherein—when conducting the transfer of the assignment—the first subscription related information and/or the first logging related information of the specific repository is accessed by the second mobile network operator;

wherein the specific repository is configured to provide the functionality of an enhanced home location register or an enhanced home subscriber server such that additional data is retrievable from the specific repository, the additional data relating to the lifecycle of the electronic device and/or of the embedded universal integrated circuit entity, the additional data comprising:
data or information related to contracts;
data or information related to status;
data or information related to external databases; and/or
data or information related to history of the usage of the electronic device and/or the associated embedded universal integrated circuit entity.

2. The method according to claim 1, wherein second subscription related information and/or second logging related information, related to the embedded universal integrated circuit entity and/or to the electronic device, is stored, by the second mobile network operator, in the specific repository, wherein the second subscription related information and/or the second logging related information relates to the use of the embedded universal integrated circuit entity and/or the electronic device with the second mobile network operator.

3. The method according to claim 1, wherein the transfer of the assignment from the first mobile network operator to the second mobile network operator is an indirect transfer such that the assignment regarding the embedded universal integrated circuit entity is transferred—in a first transfer step—from the first mobile network operator to a third mobile network operator, and—in a second transfer step—from the third mobile network operator to the second mobile network operator.

4. The method according to claim 3, wherein third subscription related information and/or third logging related information, related to the embedded universal integrated circuit entity and/or to the electronic device, is stored, by the third mobile network operator, in the specific repository, wherein the third subscription related information and/or the third logging related information relates to the use of the embedded universal integrated circuit entity and/or the electronic device with the third mobile network operator, wherein the third subscription related information and/or the third logging related information of the specific repository is accessible by the second mobile network operator and/or by the first mobile network operator.

5. The method according to claim 3, wherein during or subsequent to the first step, a status test is conducted by the embedded universal integrated circuit entity and/or the microprocessor, wherein by conducting the status test, status test result information is generated, wherein at least an information indicative of the status test result information is part of the first subscription related information and/or the first logging related information, stored by the first mobile network operator, in the specific repository accessible to the second mobile network operator and/or to the third mobile network operator.

6. The method according to claim 1, wherein the transfer of the assignment, from the first mobile network operator to the second mobile network operator, regarding the embedded universal integrated circuit entity is conducted by at least receiving, by the first mobile network operator, a request for transferring the assignment,
generating, by the first mobile network operator, of a transfer permission information including at least an identifier of the embedded universal integrated circuit entity, and
sending a transfer permission message to the embedded universal integrated circuit entity and/or to the electronic device which includes the transfer permission information.

7. The method according to claim 6, wherein the transfer permission information indicates a permission for the embedded universal integrated circuit entity to transfer the assignment from a subscription manager of the first mobile network operator to a subscription manager of the second mobile network operator or to a subscription manager of the third mobile network operator.

8. An electronic device for transferring an assignment regarding an embedded universal integrated circuit entity within the electronic device from a first mobile network operator to a second mobile network operator, wherein the embedded universal integrated circuit entity is integrated in the electronic device, wherein the electronic device comprises a microprocessor and a non-transitory computer-readable medium having processor-executable instructions, wherein the microprocessor is configured to execute the processor-executable instructions to facilitate:

initializing the embedded universal integrated circuit entity, together with the electronic device, to be used with the first mobile network operator and a corresponding mobile communication network by using an access number for communication contacts with the first mobile network operator and the mobile communication network, wherein first subscription related information and/or first logging related information, related to the embedded universal integrated circuit entity and/or to the electronic device, is stored, by the first mobile network operator, in a specific repository accessible to the first mobile network operator, wherein the first subscription related information and/or the first logging related information relates to the use of the embedded universal integrated circuit entity and/or the electronic device with the first mobile network operator, and transferring the assignment regarding the embedded universal integrated circuit entity from the first mobile network operator to the second mobile network operator, wherein—when conducting the transfer of the assignment—the first subscription related information and/or the first logging related information of the specific repository is accessed by the second mobile network operator;

wherein the specific repository is configured to provide the functionality of an enhanced home location register or an enhanced home subscriber server such that additional data is retrievable from the specific repository, the additional data relating to the lifecycle of the electronic device and/or of the embedded universal integrated circuit entity, the additional data comprising:
data or information related to contracts;
data or information related to status;
data or information related to external databases; and/or
data or information related to history of the usage of the electronic device and/or the associated embedded universal integrated circuit entity.

9. The electronic device according to claim 8, wherein the embedded universal integrated circuit entity is an embedded universal integrated circuit card.

10. A non-transitory computer-readable medium having processor-executable instructions stored thereon for transferring an assignment regarding an embedded universal integrated circuit entity within an electronic device from a first mobile network operator to a second mobile network operator, wherein the embedded universal integrated circuit entity is integrated in the electronic device, wherein the processor-executable instructions, when executed, facilitate:

initializing the embedded universal integrated circuit entity, together with the electronic device, to be used with the first mobile network operator and a corresponding mobile communication network by using an access number for communication contacts with the first mobile network operator and the mobile communication network, wherein first subscription related information and/or first logging related information, related to the embedded universal integrated circuit entity and/or to the electronic device, is stored, by the first mobile network operator, in a specific repository accessible to the first mobile network operator, wherein the first subscription related information and/or the first logging related information relates to the use of the embedded universal integrated circuit entity and/or the electronic device with the first mobile network operator; and transferring the assignment regarding the embedded universal integrated circuit entity from the first mobile network operator to the second mobile network operator, wherein—when conducting the transfer of the assignment—the first subscription related information and/or the first logging related information of the specific repository is accessed by the second mobile network operator;

wherein the specific repository is configured to provide the functionality of an enhanced home location register or an enhanced home subscriber server such that additional data is retrievable from the specific repository, the additional data relating to the lifecycle of the electronic device and/or of the embedded universal integrated circuit entity, the additional data comprising:
data or information related to contracts;
data or information related to status;
data or information related to external databases; and/or
data or information related to history of the usage of the electronic device and/or the associated embedded universal integrated circuit entity.

* * * * *